US011334498B2

(12) United States Patent
Charan et al.

(10) Patent No.: US 11,334,498 B2
(45) Date of Patent: May 17, 2022

(54) ZERO COPY METHOD THAT CAN SPAN MULTIPLE ADDRESS SPACES FOR DATA PATH APPLICATIONS

(71) Applicant: VMware, Inc., Palo Alto, CA (US)

(72) Inventors: Kamal Jeet Charan, Bangalore (IN); Adrian Drzewiecki, Palo Alto, CA (US); Mounesh Badiger, Bangalore (IN); Pushpesh Sharma, Bangalore (IN); Wenguang Wang, Palo Alto, CA (US); Maxime Austruy, Lausanne (CH); Richard P Spillane, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 343 days.

(21) Appl. No.: 16/551,761

(22) Filed: Aug. 27, 2019

(65) Prior Publication Data

US 2021/0011855 A1 Jan. 14, 2021

(30) Foreign Application Priority Data

Jul. 11, 2019 (IN) .............................. 201941027801

(51) Int. Cl.
*G06F 12/1009* (2016.01)
*G06F 16/182* (2019.01)
*G06F 9/455* (2018.01)

(52) U.S. Cl.
CPC ...... *G06F 12/1009* (2013.01); *G06F 9/45558* (2013.01); *G06F 16/183* (2019.01);
(Continued)

(58) Field of Classification Search
CPC ............... G06F 12/1009; G06F 16/183; G06F 9/45558; G06F 2009/45579; G06F 2009/45583; G06F 2212/151; G06F 2212/263; G06F 2212/1024; G06F 3/0656; G06F 3/0683; G06F 3/061
See application file for complete search history.

(56) References Cited

U.S. PATENT DOCUMENTS 4,564,903 A * 1/1986 Guyette ................ G06F 9/4843
711/147
7,454,585 B2 * 11/2008 Arimilli ................ G06F 9/3834
711/118
(Continued)

FOREIGN PATENT DOCUMENTS

WO WO-9427054 A1 * 11/1994 ............. B21J 15/048
WO WO-0072575 A2 * 11/2000 ............. H04L 45/46

*Primary Examiner* — Ramon A. Mercado
(74) *Attorney, Agent, or Firm* — Patterson + Sheridan, LLP (57) ABSTRACT

A system and method for transferring data between a user space buffer in the address space of a user space process running on a virtual machine and a storage system are described. The user space buffer is represented as a file with a file descriptor. In the method, a file system proxy receives a request for I/O read or write from the user space process without copying data to be transferred. The file system proxy then sends the request to a file system server without copying data to be transferred. The file system server then requests that the storage system perform the requested I/O directly between the storage system and the user space buffer, the only transfer of data being between the storage system and the user space buffer.

20 Claims, 9 Drawing Sheets (52) U.S. Cl.
CPC .............. *G06F 2009/45579* (2013.01); *G06F 2009/45583* (2013.01); *G06F 2212/1024* (2013.01); *G06F 2212/151* (2013.01); *G06F 2212/263* (2013.01)

(56) References Cited

U.S. PATENT DOCUMENTS

| | | | | |
|---|---|---|---|---|
| 7,596,654 | B1* | 9/2009 | Wong | G06F 12/0813 |
| | | | | 703/21 |
| 9,092,426 | B1* | 7/2015 | Bathija | G06F 13/28 |
| 9,563,361 | B1* | 2/2017 | Aslot | G06F 3/0674 |
| 2009/0183180 | A1* | 7/2009 | Nelson | G06F 9/4812 |
| | | | | 719/319 |
| 2010/0070677 | A1* | 3/2010 | Thakkar | G06F 13/385 |
| | | | | 711/6 |
| 2011/0138146 | A1* | 6/2011 | Molnar | G06F 11/3466 |
| | | | | 711/170 |
| 2014/0007090 | A1* | 1/2014 | Rugina | G06F 11/3495 |
| | | | | 718/1 |
| 2014/0029676 | A1* | 1/2014 | Abiezzi | H04N 19/162 |
| | | | | 375/240.24 |
| 2014/0164545 | A1* | 6/2014 | Davis | G06F 13/28 |
| | | | | 709/212 |
| 2016/0036879 | A1* | 2/2016 | Vadura | H04L 69/30 |
| | | | | 709/219 |
| 2016/0231929 | A1* | 8/2016 | Tsirkin | G06F 12/08 |
| 2016/0275042 | A1* | 9/2016 | Pathak | H04L 67/42 |
| 2018/0331976 | A1* | 11/2018 | Pope | G06F 9/544 |
| 2018/0349289 | A1* | 12/2018 | Wang | G06F 12/1036 |
| 2021/0011855 | A1* | 1/2021 | Charan | G06F 3/061 |

* cited by examiner

FIG. 9B

ZERO COPY METHOD THAT CAN SPAN MULTIPLE ADDRESS SPACES FOR DATA PATH APPLICATIONS

RELATED APPLICATIONS

Benefit is claimed under 35 U.S.C. 119(a)-(d) to Foreign Application Serial No. 201941027801 filed in India entitled "A ZERO COPY METHOD THAT CAN SPAN MULTIPLE ADDRESS SPACES FOR DATA PATH APPLICATIONS", on Jul. 11, 2019, by VMWARE INC., which is herein incorporated in its entirety by reference for purposes.

BACKGROUND

A virtual storage area network (SAN) is a virtualized version of a storage area network (SAN) and typically provides persistent storage for a cluster of servers. The vSAN system includes a plurality of virtual composite objects, such as virtual disks, each composed of a plurality of virtual component objects that provide persistent storage to the servers in the cluster. The component objects of the composite objects can be mapped to any groups of physical storage devices that are available to the cluster.

Often, a file system runs in or on an operating system to provide a file abstraction to the users of the servers in the cluster. The file system is backed by the vSAN storage system so that when users make calls to the file system, the file system requests a data transfer to or from the vSAN system and a user receives data from the file system or writes data to the file system.

While the vSAN is capable of high performance, in certain instances, it cannot deliver that performance to the servers in the cluster because the file system and the operating system copy data between various layers through these systems. The copying of data multiple times throughout the operating system and file system slows down the delivery of data to and from the storage system, restricting the performance that the vSAN system could provide.

In such circumstances, it is desirable to improve the operation of the file system and operating system so that the high performance which the vSAN is capable of can be delivered to the users of the servers.

DETAILED DESCRIPTION

Embodiments described herein include the operations of a file system server that operates with a storage system, such as a virtual storage array, to transfer user data directly between a user space buffer in the address space of a user space process and the storage system in response to an I/O read request from or write request to the storage system by the user space process.

Figure 1A:
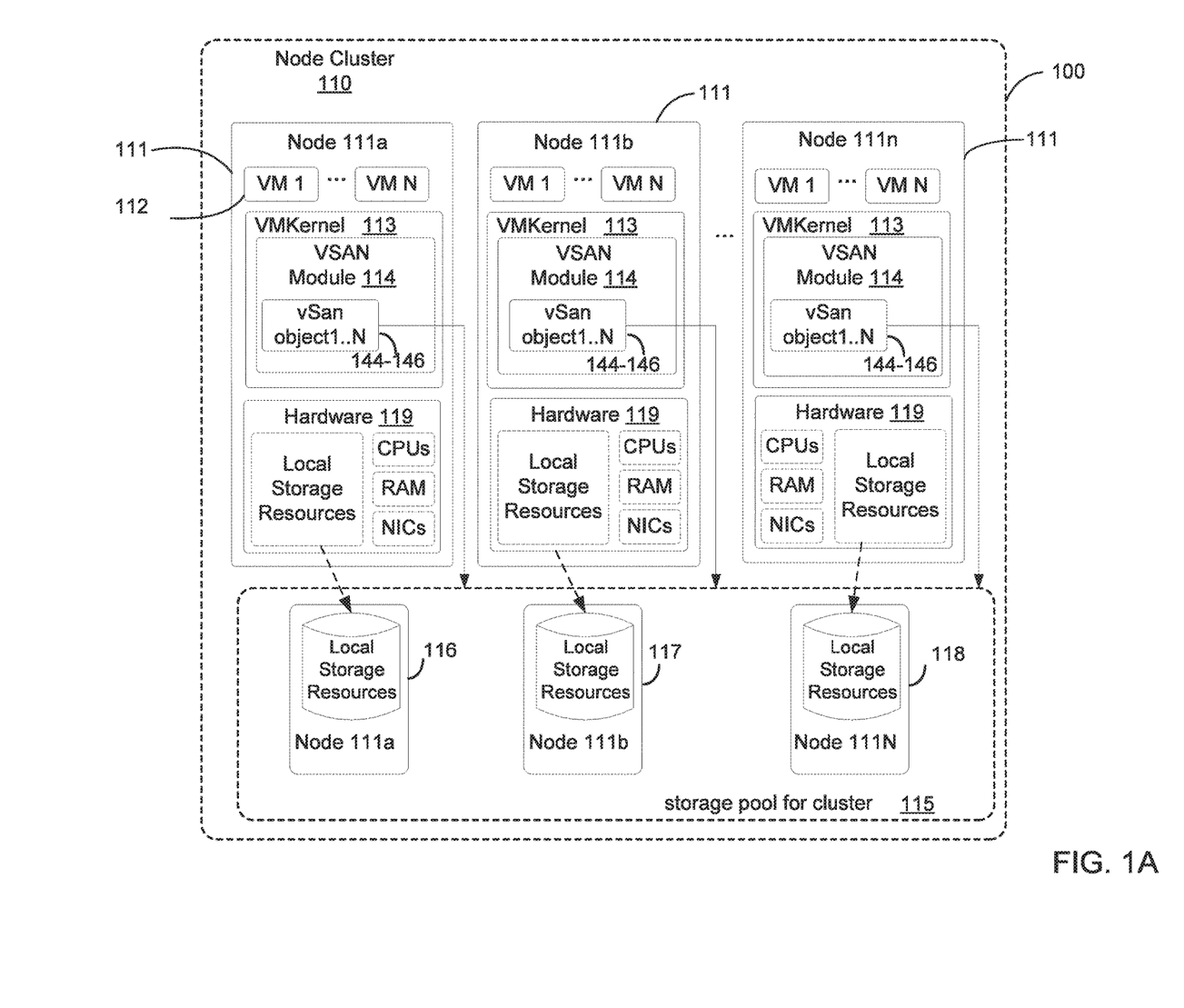
FIG. 1A depicts a virtual storage area network in which embodiments may be implemented.

FIG. 1A depicts a cluster of nodes in which embodiments ma be implemented. Each node 111a-n in cluster 110 includes one or more virtual machines, $VM_{1-N}$, 112. It should be noted that though certain aspects are described with respect to VMs 112, they may similarly apply to other types of virtual computing instances (VCIs), such as containers, etc. Each node 111a-n also includes a virtual machine kernel (VMKernel) 113 and hardware 119.

VMKernel 113 includes a virtual storage area network (vSAN) module 114 for operating the vSAN storage system and one more vSAN objects1 . . . N 144-146. vSAN objects1 . . . N 144-146 are storage components such as virtual disks and components of virtual disks.

Hardware 119 includes one or more CPUs, RAM, and one or more network interface controllers (NICs) which are used by the nodes 111a-n in cluster 110 to communicate with each other, and local storage resources 116, 117, 118.

Local storage resources 116, 117, 118 for each node 111a-n form a storage pool 115 for cluster 110 and vSAN $objects_{1 \ldots N}$ 144-146 are mappable to one or more of available storage resources 116, 117, 118 in each node 111a-n, thereby enabling any of vSAN $objects_{1 \ldots N}$ 144-146 in each node 111a-n to take advantage of all storage resources 116, 117, 118 in storage pool 115.

Figure 1B:
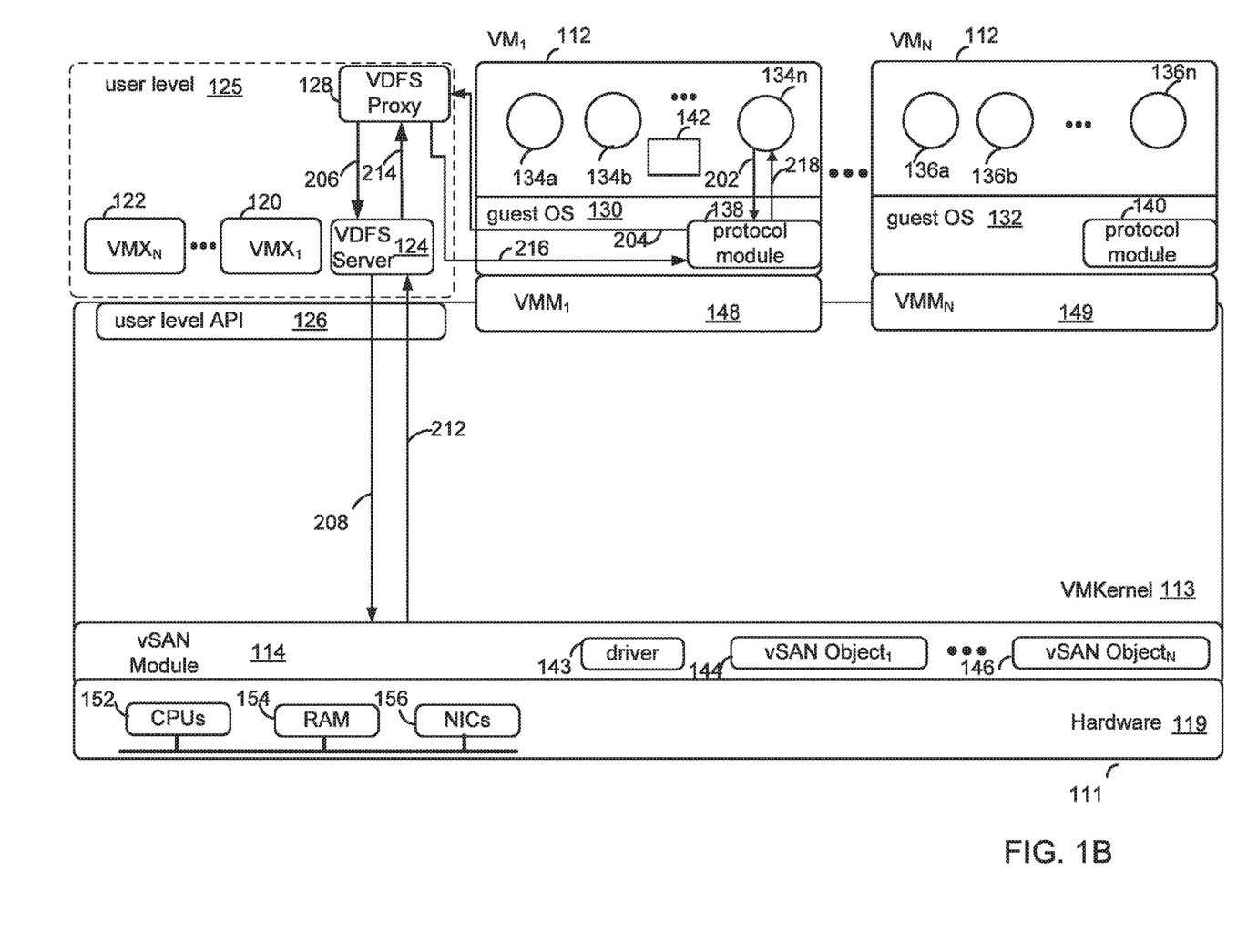
FIG. 1B depicts an example system in which embodiments ma be implemented.

FIG. 1B depicts an example node in more detail. As depicted in FIG. 1B, node 111 includes hardware 119, VMKernel 113, one or more virtual machines (VMs) 112, one or more virtual machine helper processes (VMXs) 120-122, a VDFS Proxy process 128, and a VDFS Server 124.

As also depicted in FIG. 1B, hardware 119 includes CPUs 152, RAM 154, and NICs 156, as described in relation to FIG. 1A.

VMKernel 113 is a hardware abstraction layer, and in one embodiment is a bare-metal hypervisor VMKernel 113 includes a vSAN module 114, a virtual distributed file system (VDFS) Server 124, a user level application programming interface (API) 126 and one or more virtual machine monitors (VMM) 148, 149. Operating in the user level 125 are one or more VMX processes 120-122, VDFS Proxy process 128, and VDFS Server 124.

VSAN module 114 as depicted in FIG. 1B includes a vSAN driver 143 and one or more vSAN objects 144-146. vSAN driver 143 services storage requests by reading or writing vSAN storage objects 144-146, which, as mentioned above, are mapped to local storage resources 116-118 available to node cluster 110.

Each of the one or more virtual machines VMs 112 includes a guest operating system (guest OS) 130, one or more user space processes 134a-n running on the guest OS 130 and a user space buffer 142 for at least one of user space processes 134a-n. User space buffer 142 contains user space process data that can be transferred to or from vSAN objects 144-146.

Guest OS 130, in one embodiment, is a Linux® operating system kernel, and includes, in part, page tables that map addresses of user space processes 134a-n, which are guest virtual addresses (gVA), to physical pages of guest OS 130, which are called guest physical pages (gPA). These page tables are thus maps from gVA to gPA. Guest OS 130 also includes a protocol module 138, 140 that provides a communication path (shown only for guest OS 130) for file operations from a guest OS 130, 132 to VDFS Proxy process 128. Protocol module 138, 140 implements a network protocol, which, in one embodiment, is the 9P protocol available in a standard Linux® operating system distribution. The 9P protocol is used for messages (e.g., a sequence of bytes) between clients and servers. The client, in this case, is guest OS 130, which transmits requests (T-messages) to a server (VIEWS Proxy process 128), which subsequently returns replies (R-messages) to the client. T-messages include a TWRITE(fid, offset, count, data), a TREAD(fid, offset, count), RWRITE(count), and RREAD(count, data), where fid is an integer specifying a current file, offset specifies a position in the file, count specifies the size of the data transfer and data specifies the data to be transferred. Other messages include those that establish a connection and messages that traverse a directory hierarchy of a file system. The 9P module supports the VSockets (VSOCK) API as well as other transport protocols, including the transmission control protocol (TCP).

VDFS Proxy process 128 is an interface to local VDFS Server 124 and to any remote VDFS Servers that may be present in the node cluster 110 or accessible by the node cluster 110. VDFS Proxy process 128 receives requests from protocol module 138 and communicates the requests to VDFS Server 124.

Figure 2:
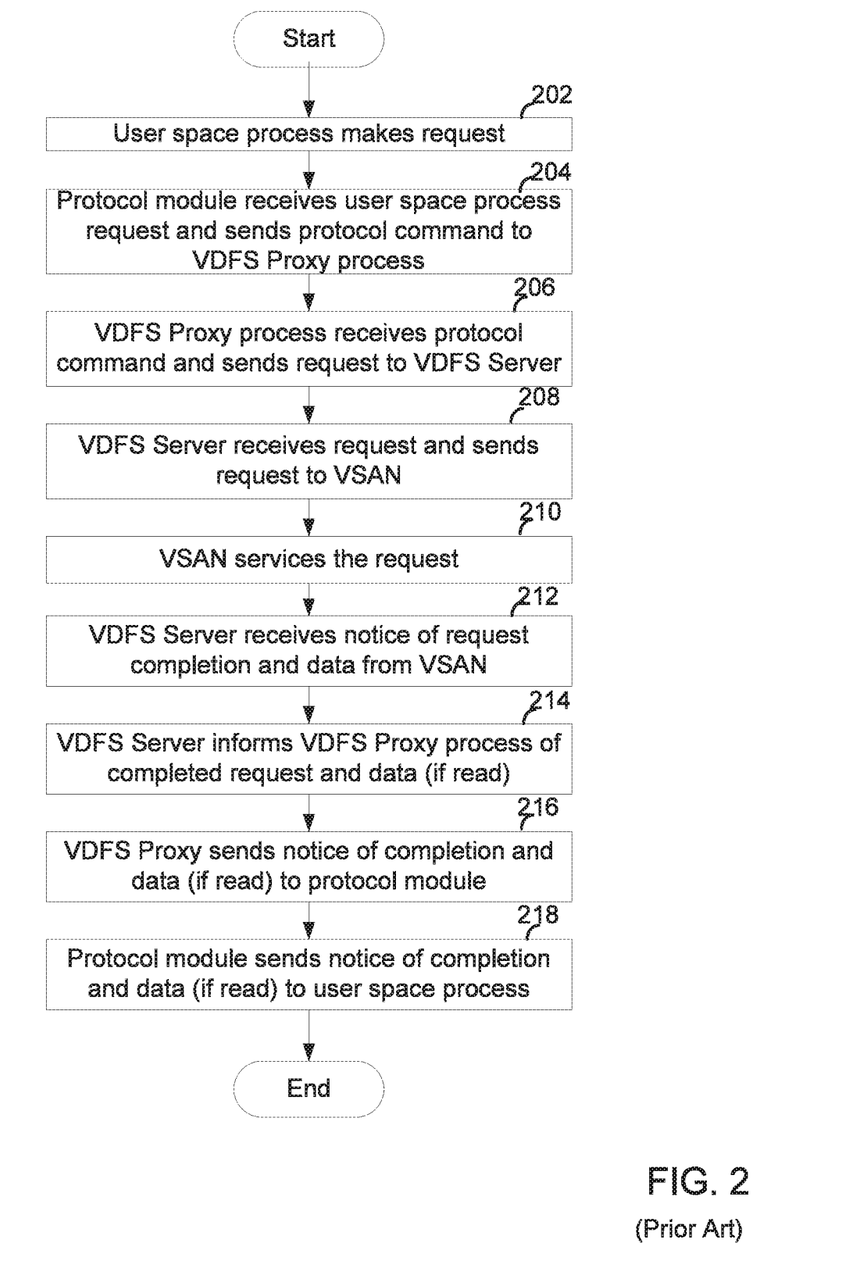
FIG. 2 depicts a flow of operation for a read or write request, according to the prior art.

FIG. 2 depicts a flow of operations for a read or write request, according to the prior art. In step 202, one of user space processes 134a-n, 136a-n makes an I/O request, which in some embodiments is a system call, to persistent storage, such as a virtual disk provided by VMKernel 113 to guest OS 130, 132. The I/O request is either an I/O read or I/O write, with the data being read from or written to buffers, such as user space buffer 142, in user space processes 134a-n, 136a-n via a request to protocol module 138 in the guest OS 130, 132.

In step 204, protocol module 138 receives the I/O request from user space process 134a-n, 136a-n and sends an I/O command according to the protocol implemented by protocol module 138 to VDFS Proxy process 128. In the case of an I/O write, protocol module 138 formulates, in step 204, an I/O write command as a message in the form of a sequence of bytes that includes the data from user space buffer 142. In one embodiment, protocol module 138 is the 9P module, and the I/O write message is TWRITE(fid offset, count, data). The message from protocol module 138 transfers the data to VDFS Proxy process 128. In one embodiment, the data is communicated via data packets in the transport layer used by VSOCK. In the case of an I/O read, protocol module 138 formulates, in step 204, an I/O read command as a message requesting a sequence of bytes representing the requested data that is to be loaded into user space buffer 142. If protocol module 138 is the 9P module, then protocol module 138 sends a TREAD(fid, offset, count) message.

In step 206, VDFS Proxy process 128 receives the protocol command and the transport layer data packets and sends the data packets to VDFS Server 124. In one embodiment, VDFS Proxy process 128 sends the data packets over a TCP transport using either loopback or inter-cluster network, if the target YEWS server is on the same Physical host as the VDFS proxy, the TCP loopback interface is automatically chosen by the TCP layer for faster data transfer since data does not need to travel on the inter-cluster network. Otherwise, the regular inter-cluster network is used for transferring data to VDFS server 124. The data packets contain the data to be written or the data being read.

In step 208, VDFS Server 124 receives and collects the data packets from VDFS Proxy process 128 and transmits the collected data via a system call to vSAN system 102.

In step 210, vSAN system 102 services the data transfer request by having vSAN driver 143 read the requested data from or write the provided data to the one or more vSAN storage objects 110, 112.

In step 212, VDFS Server receives notice of the request completion and the data from vSAN system 102. In step 214, VDFS Server 124 informs VDFS Proxy process 128 of the completed request and data.

In step 216, VDFS Proxy process 128 sends notice of completion to protocol module 138, by sending a protocol message, such as a RREAD(Count, data) or RWRITE (count) message, when protocol module 138 is the 9P module. In the case of a read, the notice of completion includes the requested data, and in the case of a write, the notice of completion indicates the amount of the data written.

In step 218, protocol module 138 sends notice of completion and data if a read was requested to user space process 134a-n, 136a-n making the request.

Thus according to FIG. 2, read or write data is copied multiple times. For a write I/O, the user space process 134a-n, 136a-n sends a first copy of the data from user space buffer 142 to a kernel buffer in guest OS 130, 132. Protocol module 138, such as the PIP module, sends a second copy of the data in the form of a TWRITE(fid, offset, count data) message to VDFS Proxy process 128, which sends a third copy of the data to VDFS Server 124. VDFS Server 124 then sends a fourth copy of the data to vSAN objects 144-146, which finally write the data to local storage resources 116-118. For a read I/O, a first copy of the requested data is received by VDFS Server 124 from vSAN objects 144-146. VDTS Server 124 sends a second copy of the data to VDFS Proxy process 128, which then sends a third copy of the data to protocol module 138, which is in the form of a RREAD (count, data) message when protocol module is 9P. Protocol module then sends a fourth copy of the read data to user space buffer 142. Due to the amount of CPU time consumed copying data multiple times, the flow according to FIG. 2 is unable to deliver performance matching the capabilities of vSAN itself.

Figure 3:
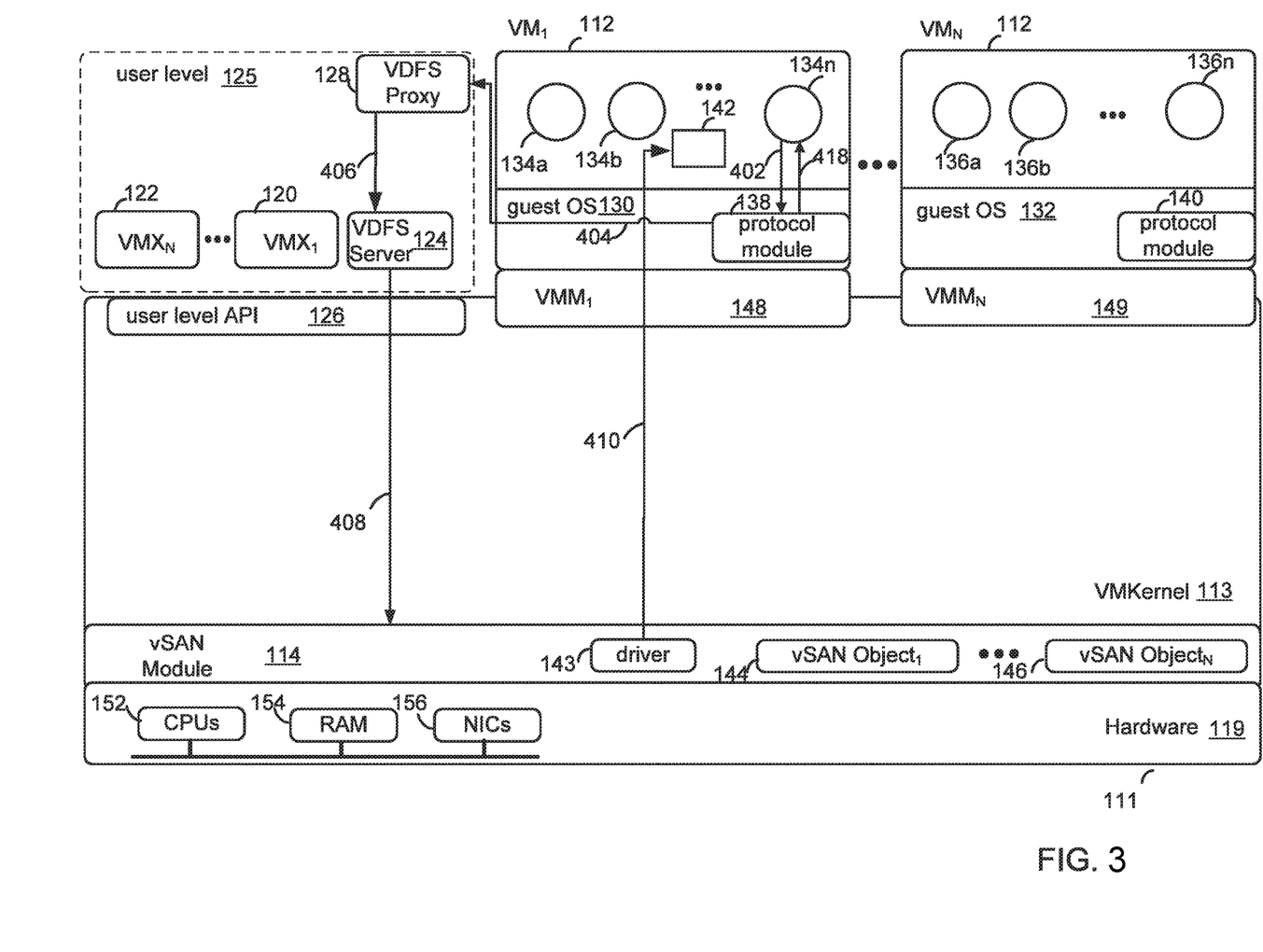
FIG. 3 depicts an example system in which embodiments may be implemented.

FIG. 3 depicts an example system 100 (e.g., similar to a node 111) in which embodiments may be implemented. In the example system of FIG. 3, protocol module 138, 140, VMX process 120, 122, VDFS Proxy process 128, VDFS Server 124 and vSAN driver 143 are altered to operate according to the flow of operations described in reference to FIG. 4, which depicts an overall flow of operations for a read or write I/O request, in one embodiment.

Figure 4:
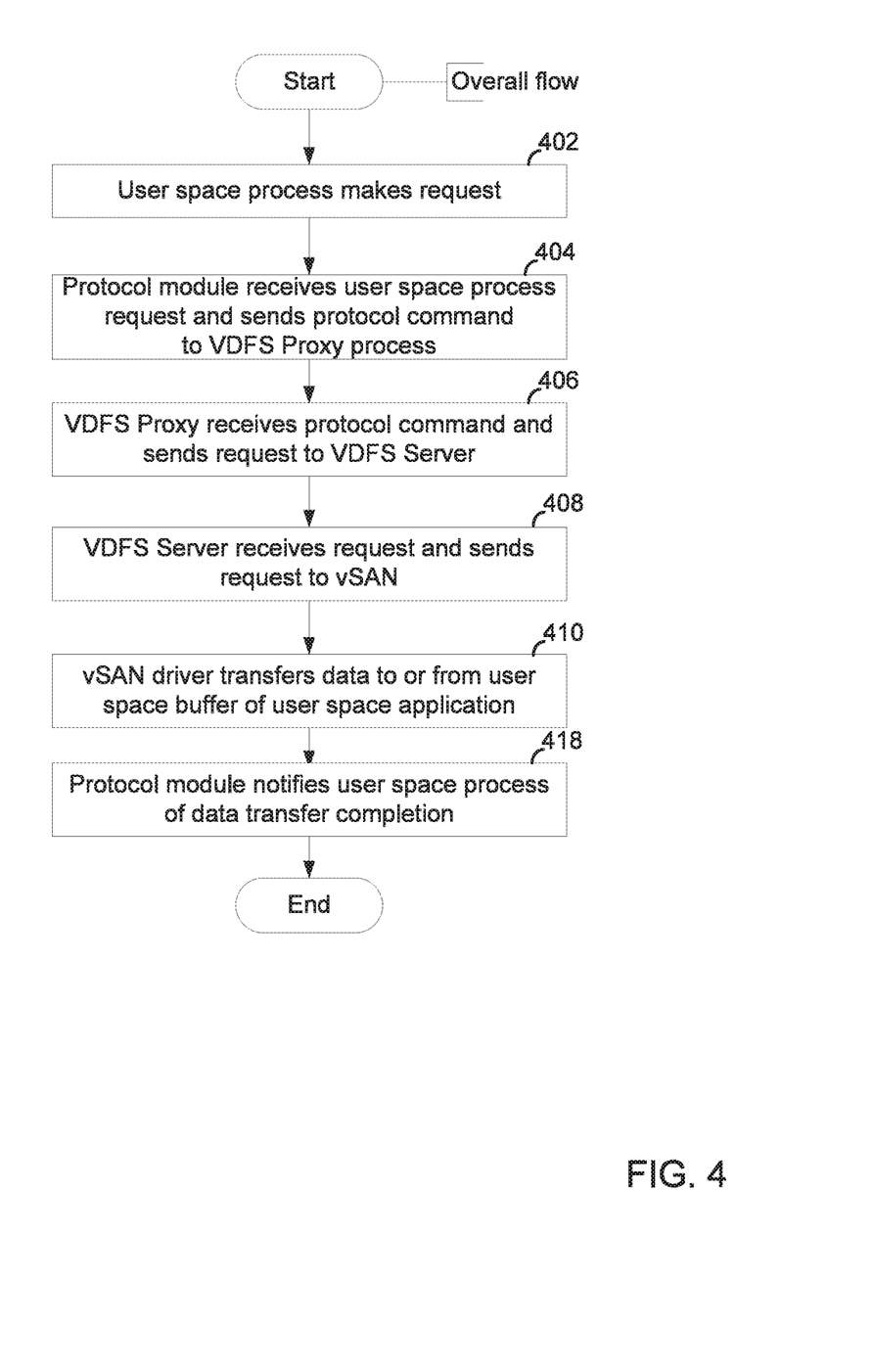
FIG. 4 depicts a flow of operations for a read or write request, in one embodiment.

Referring to FIG. 4, in step 402, one user space process 134n of user space processes 134a-n, 136a-n makes an I/O request to protocol module 138. Step 402 is further described in reference to step 602 of FIG. 6.

In step 404, protocol module 138 receives the I/O request and sends a protocol command to VDFS Proxy process 128. Step 404 is further described in reference to steps 702, 704 of FIG. 7.

In step 406, VDFS Proxy process 128 receives the protocol command and sends a request as a message to VDFS Server 124. Step 406 is further described in reference to steps 802, 804 of FIG. 8.

In step 408, VDFS Server 124 receives the I/O request and requests that vSAN driver 143 of vSAN module 114 transfer data from vSAN storage objects 144-146 to user space buffer 142 or from user space buffer 142 to vSAN storage objects 144-146.

In step 410, the v SAN driver 143 transfers the data from v SAN objects 144-146 to user space buffer 142 or from user space buffer 142 to vSAN storage objects 144-146. Step 408 is further described in reference to step 910 of FIG. 9A.

In step 418, the protocol module notifies user space process 134n of the data transfer completion. Step 418 is further described in reference to step 604 of FIG. 6.

In the descriptions that follow, reference is made to a Send('msg' to dest) step and a Received('msg' from source) step. The Send('msg' to dest) step is an asynchronous, non-blocking communications primitive that sends a message, 'msg' to one or more destinations, 'dest', without regard to the underlying communications mechanism. The message can be any item, including data, data structures, strings, functions, and objects. The Received('msg' from source) step is a predicate that indicates the presence of a message, 'msg' provided by one or more sources, 'source', without regard to the underlying communications mechanism. If the predicate is true, the message contents are available for subsequent use. If the predicate is false, then no message has arrived, and the process may wait until the predicate is true. Alternatively, a process or function with the Received step may test the predicate and if not true, proceed with other steps including retesting the predicate. Any communications protocol, such as system calls and returns or TCP, can be realized by programs utilizing Send and Received steps.

Figure 5:
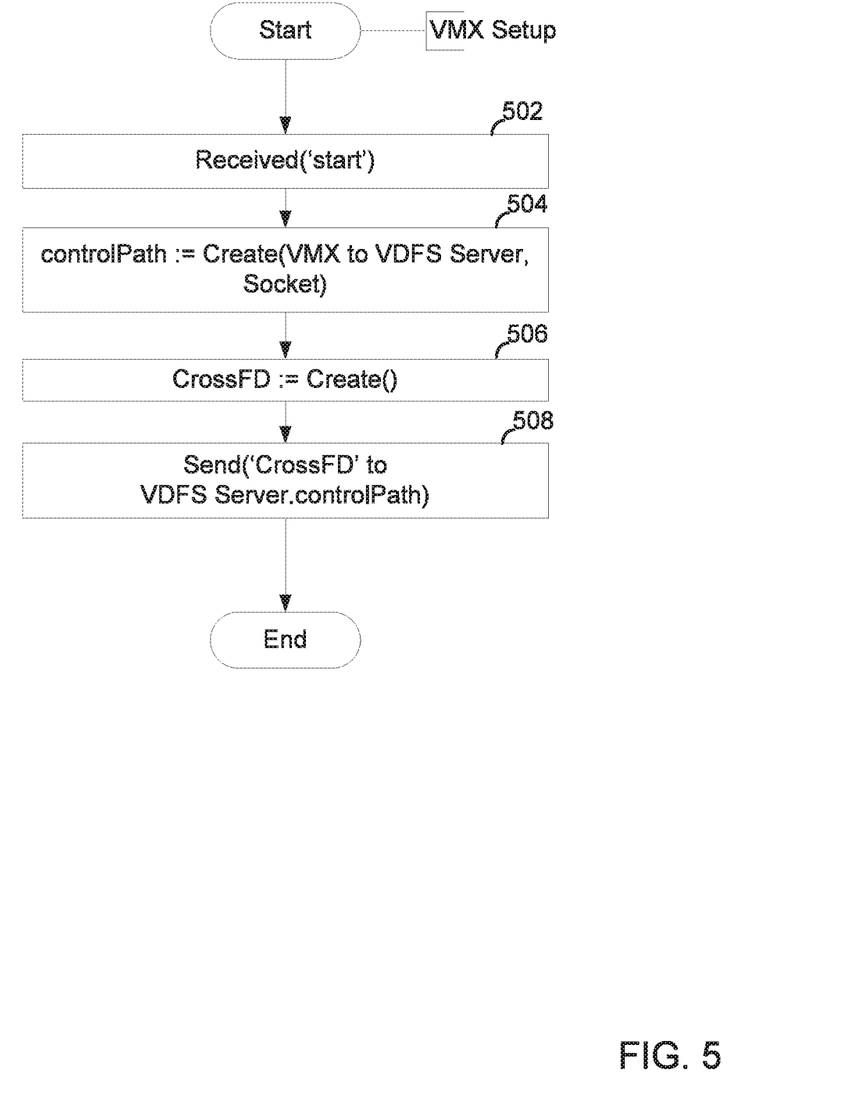
FIG. 5 depicts a flow of operations, in an embodiment, for setting up a helper process for a virtual machine to support the flow of operations depicted in FIG. 4.

FIG. 5 depicts a flow of operations, in an embodiment, for setting up a virtual machine helper process (VMX) to support the flow of operations depicted in FIG. 4. In step 502, CHIC of VMX processes 120, 122 receives a "start" message, and in step 504 responds by creating a control path from VMX process 120 to VDFS Server 124. In one embodiment, the control path is a Unix Domain Socket of VDFS Server 124. In step 506, VMX process 120 creates a Cross FD, and in step 508, sends a message containing the Cross FD to VDFS Server 124 over the previously established control path. The Cross FD is a mechanism provided by system 100 in which a first user space process can perform I/O using the address space of second user space process if the first user space process has arranged the creation of the Cross FD and sent a message, say via a 'sendmesg' system call of system 100, to the second process containing the Cross FD. In effect, a user space process residing in one user space treats the address space of a guest VM as a file, which is referenced by the Cross FD, which is the file handle (also called a file descriptor) for the file. Because VMX process 120 has access to the page tables which map gVA of user space processes 134a-n, 136a-n to gPA of guest OS 130, 132, of the VM 112 for which it is the helper process, VMX process 120, 122 can convert the virtual address in the user space of the guest OS 130, 132 to a set of guest physical page addresses which can be used with the Cross FD mechanism.

Figure 6:
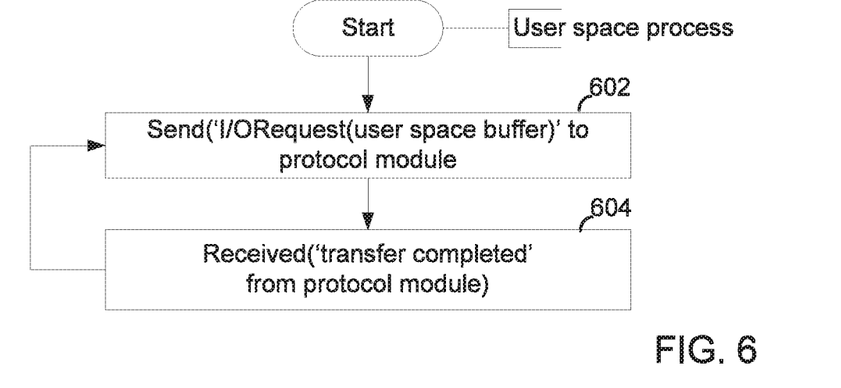
FIG. 6 depicts a flow of operations, in an embodiment, of one of the user space processes.

FIG. 6 depicts a flow of operations, in an embodiment, of one of the user space processes. In step 602, one user space process 134n of the user space processes 134a-n, 136a-n sends a message containing an I/O read or write request with user space buffer 142 as a parameter specified by a virtual address pointer in the user space of the guest OS to protocol module 138. In one embodiment, the I/O request is a system call. In step 604, user space process 134n awaits the receipt of a 'transfer completed' message from protocol module 138. In one embodiment, the transfer completed' message can be a return from a system call in another embodiment, the 'transfer completed' message can be a signal from protocol module 138, using the signal mechanism of guest OS 130, 132, when the guest OS 130, 132 is a Linux® operating system.

Figure 7:
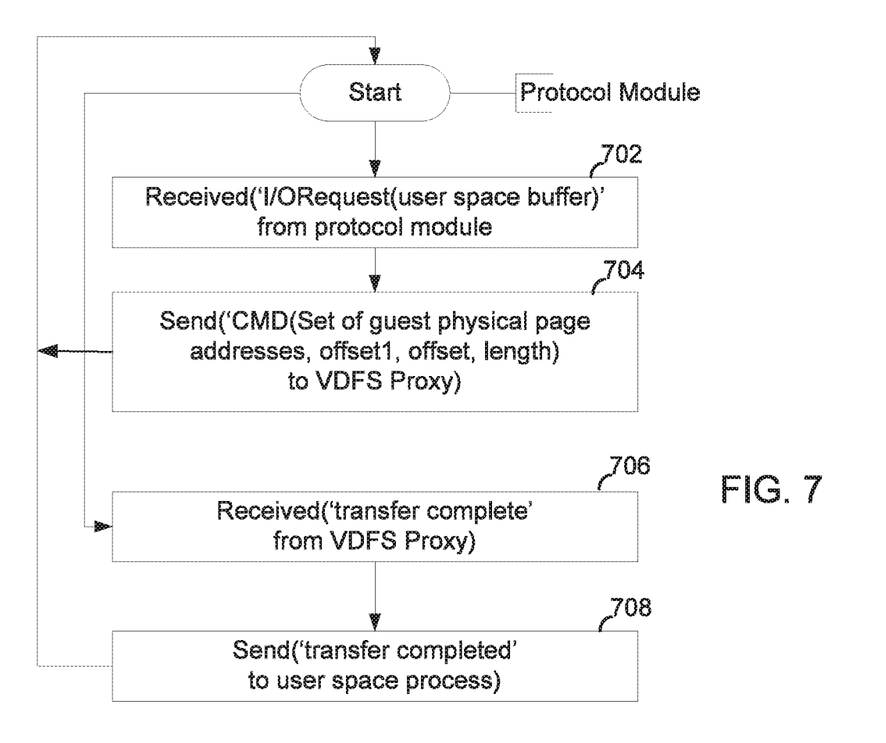
FIG. 7 depicts a flow of operations, in an embodiment, of the protocol module.

FIG. 7 depicts a flow of operations, in an embodiment, of the protocol module. In step 702, protocol module 138 receives the request from user space process 134n, specifying an I/O operation and user space buffer 142.

In step 704, protocol module 138 sends a message, containing a command (e.g., 'CMD') according to the protocol of protocol module 138 to VDFS Proxy process 128. The command, 'CMD', specifies either a TREADX, TWRITEX, RREADX, or RWRITEX, which are commands in an extended version, 9P2000.X, of the 9P protocol. Parameters for the extended commands include a set of guest physical page addresses corresponding to user space buffer 142, a first offset (offset1), a second offset (offset) and a transfer length (length). The first offset value, offset1, specifies an offset into a first page for an unaligned I/O transfer, the second offset value, offset, specifies a starting position aligned, to a page, and the length specifies the size of the data transfer. For example, if the transfer request is for 9 kilobytes (kB) and the page size in the guest OS is 4 kilobytes, then at least three 4 kB pages are needed. A 2 kB misaligned transfer requires that offset1 be set at 2 kB into the first page, that offset be set at the beginning of the second page and length be set at 9 kB. The last 1 kB of the third page is not part of the transfer.

In step 706, protocol module 138 receives a 'transfer completed' message from VDFS Proxy process 128 and in step 708 sends a 'transfer completed' message to the user space process 134n.

Figure 8:
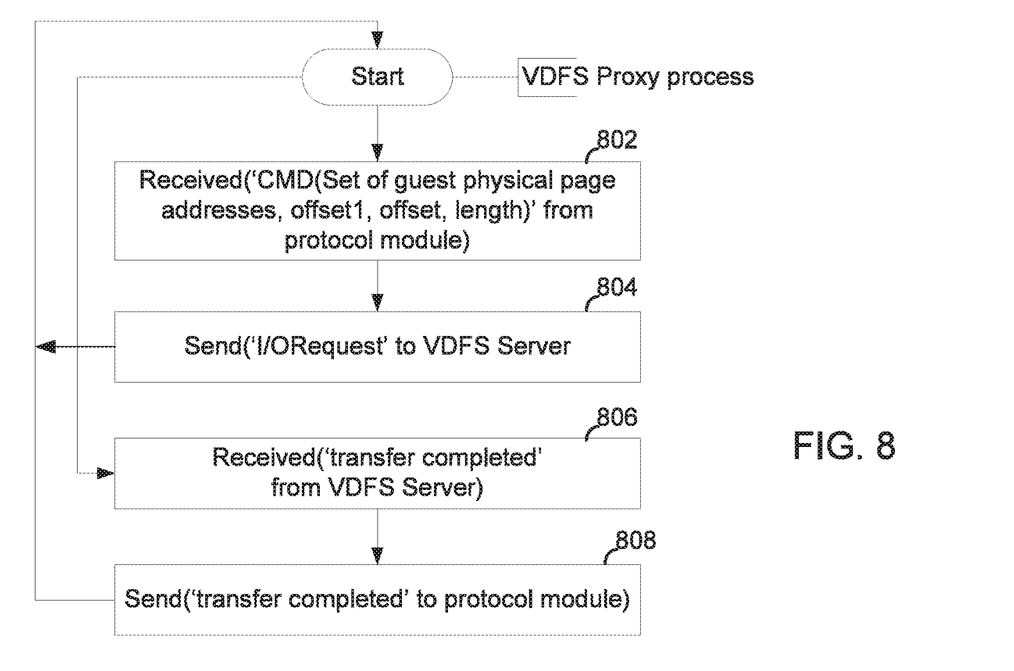
FIG. 8 depicts a flow of operations, in, an embodiment, of a proxy process for a virtual distributed file system.

FIG. 8 depicts a flow of operations, in an embodiment, of the VDFS Proxy process. In step 802, VDFS Proxy process 128 receives a message containing a protocol command 'CMD' with a set of guest physical page addresses, first offset, second offset, and length parameters. In step 804, VDFS Proxy process 128 sends a message containing an I/O request, specifying the set of guest physical addresses to VDFS Server 124. In step 806, VDFS Proxy process 128 receives a 'transfer completed' message from VDFS Server 124 and in step 808 sends a 'transfer completed' message to protocol module 138.

Figure 9A:
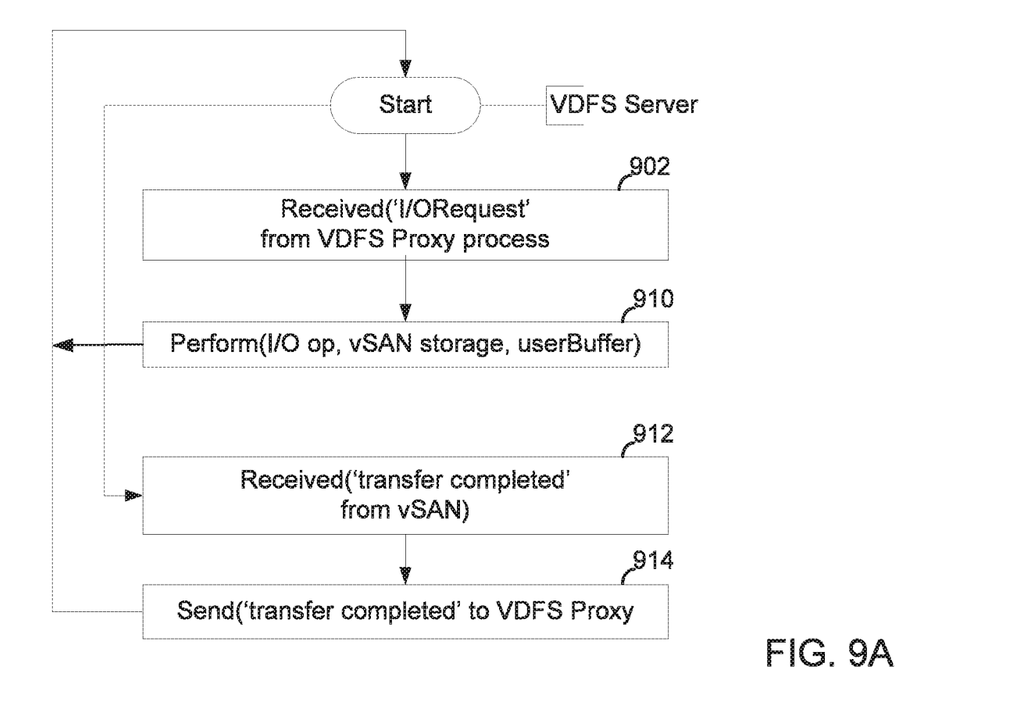
FIG. 9A depicts a flow of operations, in an embodiment, of a virtual distributed file system server.

FIG. 9A depicts a flow of operations, in an embodiment, of the VDFS Server. In step 902, VDFS Server 124 receives a message containing the I/O request from VDFS Proxy process 128. In step 910, VDFS Server 124 has vSAN driver 143 perform the I/O read or write operation transferring data directly to or from user space buffer 142 specified by the Cross FD VA. vSAN driver in VMKernel 113 uses the set of guest physical page addresses, which VDFS Proxy process 128 received, to determine the set of machine pages of RAM 154 to which or from which data is to be transferred. In step 912, VDFS Server 124 receives a 'transfer completed' message from vSAN module 114. In one embodiment, the 'transfer completed' message is in the form of a callback from vSAN module 114. In step 914, VDFS Server 124 sends a 'transfer completed message' to VDFS Proxy process 128.

Figure 9B:
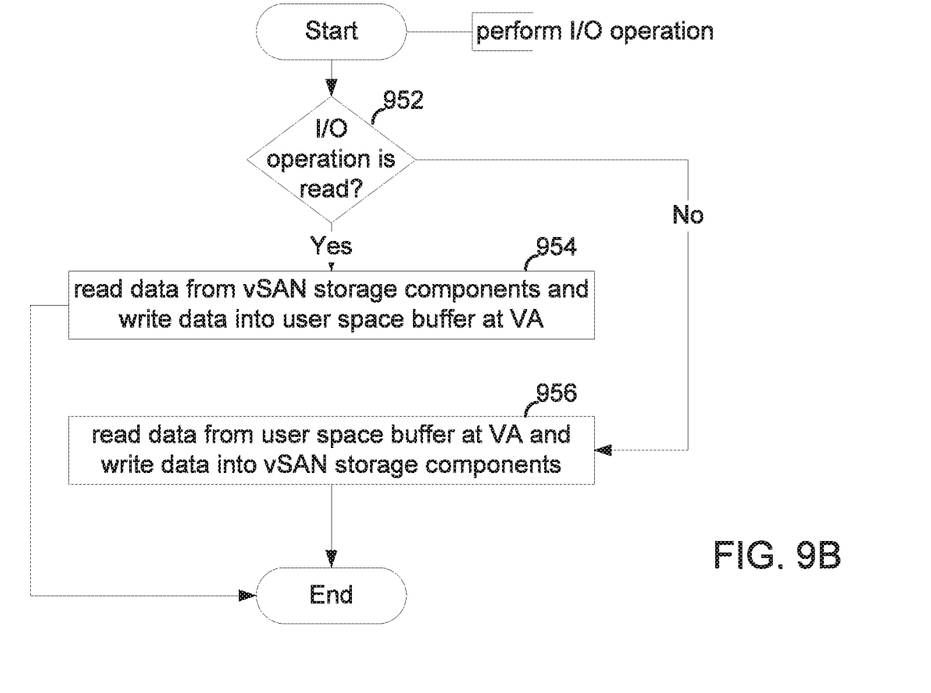
FIG. 9B depicts a flow of operations, in an embodiment, of a function fat performs the I/O operation.

FIG. 9B depicts a flow of operations in an embodiment, of the vSAN driver performing, the direct) read or write. In step 952, vSAN driver 143 determines whether the request is an I/O read operation. If so, then in step 954, vSAN driver 143 reads data from vSAN storage components 144, 146 and writes the data into user space buffer 142 of VM 112 making the request virtual address received from VMX process 120. If, as determined iii step 952, the request is an I/O write operation, then in step 956, vSAN driver 143 reads data from user space buffer 142 at the virtual address received from VMX process 120 and writes the data into vSAN storage components 144, 146.

Thus, VDFS Proxy process 128 communicates an I/O read or write request to VDFS Server 124, which then communicates with a previously set up Cross FD. VDFS Server 124 then uses the Cross FD VA to specify to vSAN driver 143 the location user space buffer 142, which is treated as a file, in user space of VM 112 to which or from which the transfer of data is to occur. In this manner, multiple copying of the data from user space buffer 142 to VDFS Proxy process 128 and VDFS Server 124 is avoided. Only one transfer occurs, which is a transfer between user space buffer 142 and vSAN system 114. The single transfer of data substantially improves the performance of the I/O operations.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits source isolation and allocation among the contexts In the foregoing embodiments, virtual machines are used as an example for the contexts and hypervisors as an example for the hardware abstraction layer. As described above, each virtual machine includes a guest operating system in which at least one application runs it should be noted that these embodiments may also apply to other examples of contexts, such as containers not including a guest operating system, referred to herein as "OS-less containers" (see, www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer, program modules embodied in one or more computer-readable media. The term computer-readable medium refers to any data storage device that can store data which can thereafter be input to a computer system. Computer readable media may be based on any existing or subsequently developed technology for embodying computer programs in a manner that enables them to be read by a computer. Examples of a computer-readable medium include a hard drive, solid state drive (SSD), NVMe persistent memory, phase change memory, network attached storage (NAS), read-only memory, random-access memory (e.g., a flash memory device), a CD (Compact Discs)—CD-ROM, CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims, in the claims, elements and/or steps do not imply any particular order of operation, unless explicitly stated in the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for transferring data between a storage system and a user space buffer of a user space process running in a virtual machine having an address space including a guest virtual address space for user space processes and a kernel space for a guest operating system, the method comprising:
   receiving an I/O read or write request by a file system server backed by the storage system, the file system server managing a file system having a set of files;
   receiving a set of guest physical page addresses representing the user space buffer, the set of guest physical page addresses being derived from a guest virtual address of the user space buffer, wherein the user space buffer is in an address space of the virtual machine and the address space is identified as a file in the file system by a file descriptor, and the file descriptor is obtained from a helper process of the virtual machine; and
   requesting that the storage system send data to or receive data from the user space buffer, wherein the storage system locates the user space buffer using the file descriptor, wherein the storage system transfers the data to or from the user space buffer, after locating the user space buffer, in response to the I/O read or write request.

2. The method of claim 1, wherein the I/O request received by the file system server is obtained from a proxy process that interacts with the file system server, the proxy process handling local and remote requests for I/O by the user space process.

3. The method of claim 2,
wherein a kernel that supports the virtual machine has a user level space; and
wherein the proxy process runs in the user level space.

4. The method of claim 2, wherein the proxy process obtains the I/O request from a protocol module residing in the guest operating system, the protocol module accepting requests from the user space process running in the virtual machine.

5. The method of claim 4,
wherein the guest operating system maps guest virtual page addresses to guest physical page addresses; and
wherein the protocol module has an extended protocol for handling requests that are not aligned with guest physical pages addresses of the guest operating system.

6. The method of claim 1,
wherein a kernel that supports the virtual machine has a user level space; and
wherein the helper process of the virtual machine runs in the user level space.

7. The method of claim 1,
wherein the helper process of the virtual machine has access to page tables of the guest operating system, the page tables mapping guest virtual page addresses to guest physical page addresses.

8. A computer system comprising:
a memory that contains a kernel, one or more virtual machines, each having an address space including a guest virtual address space for user space processes and a user space buffer for at least one of the user space processes and a kernel space for a guest operating system, one or more helper processes, each for one of the virtual machines, and a file system server that manages files in a file system for the kernel;
a storage system that backs the file system server;
one or more processors that run the kernel, the one or more virtual machines, the guest operating systems of the one or more virtual machines, the one or more user space processes, the helper processes for each virtual machine, the file system server and the storage system;
wherein the file system server is configured to:
receive an I/O read or write request derived from a user space process;
receive a set of guest physical addresses representing the user space buffer, the set of guest physical addresses being derived from a guest virtual address of the user space buffer, wherein the user space buffer is in an address space of the virtual machine and the address space is identified as a file in the file system by a file descriptor, and the file descriptor is obtained from the helper process of the virtual machine; and
request that the storage system send data to or receive data from the user space buffer, wherein the storage system locates the user space buffer using the file descriptor, wherein the storage system transfers the data to or from the user space buffer, after locating the user space buffer, in response to the I/O read or write request.

9. The computer system of claim 8,
wherein the memory contains a proxy process that interacts with the file system server, the proxy process handling local and remote requests for I/O by the user space process; and
wherein the I/O request received by the file system server is obtained from the proxy process.

10. The computer system of claim 9,
wherein the kernel that supports the one or more virtual machines has a user level space; and
wherein the proxy process runs in the user level space.

11. The computer system of claim 9,
wherein the virtual machine contains a protocol module running in the guest operating system, the protocol module accepting requests from the user space process running in the virtual machine; and
wherein the proxy process obtains the I/O request from the protocol module.

12. The computer system of claim 11,
wherein the guest operating system maps guest virtual page addresses to guest physical page addresses; and
wherein the protocol module has an extended protocol for handling requests that are not aligned with guest physical page addresses of the guest operating system.

13. The computer system of claim 8,
wherein the kernel supports a user level space; and
wherein the helper process for the virtual machine runs in the user level space.

14. The computer system of claim 8, wherein the helper process for the virtual machine has access to page tables of the guest operating system, the page tables mapping guest virtual page addresses to guest physical page addresses.

15. A computer program product for transferring data between a storage system and a user space buffer of a user space process running in a virtual machine having an address space including a guest virtual address space for user space processes and a kernel space for a guest operating system, the computer program product comprising:
a computer-readable storage medium having computer-readable program code embodied therewith, the computer-readable program code executable by one or more computer processors to:
receive an I/O read or write request by a file system server backed by the storage system, the file system managing a file system having a set of files;
receive a set of guest physical addresses representing the user space buffer, the set of guest physical addresses being derived from a guest virtual address of the user space buffer, wherein the user space buffer is in an address space of the virtual machine and the address space is identified as a file in the file system by a file descriptor, and the file descriptor is obtained from a helper process of the virtual machine; and
request that the storage system send data to or receive data from the user space buffer, wherein the storage system locates the user space buffer using the file descriptor, wherein the storage system transfers the data to or from the user space buffer, after locating the user space buffer, in response to the I/O read or write request.

16. The computer program product of claim 15,
wherein the I/O request received by the file system server is obtained from a proxy process that interacts with the file system server, the proxy process handling local and remote requests for I/O by the user space process; and wherein the proxy process obtains the I/O request from a protocol module that accepts requests from the user space process running in the virtual machine.

17. The computer program product of claim 16, wherein a kernel that supports the virtual machine has a user level space; and wherein the proxy process runs in the user level space.

18. The computer program product of claim 16, wherein the guest operating system maps guest virtual page addresses to guest physical page addresses; and wherein the protocol module has an extended protocol for handling requests that are not aligned with guest physical page addresses of the guest operating system.

19. The computer program product of claim 15, wherein a kernel that supports the virtual machine has a user level space; and wherein the helper process of the virtual machine runs in the user level space.

20. The computer program product of claim 15, wherein the helper process of the virtual machine has access to page tables of the guest operating system, the page tables mapping guest virtual page addresses to guest physical page addresses.

* * * * *